(12) United States Patent
Gill et al.

(10) Patent No.: US 6,723,190 B1
(45) Date of Patent: *Apr. 20, 2004

(54) ESD SENSITIVITY IN TITANIUM/BORON COMPOSITIONS

(75) Inventors: Robert C. Gill, White Plains, MD (US); Carl Gotzmer, Accokeek, MD (US); Pamela Carpenter, Indian Head, MD (US); Eric Schlegel, Indian Head, MD (US)

(73) Assignee: The United States of America as represented by the Secretary of the Navy, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/697,247

(22) Filed: Oct. 27, 2000

(51) Int. Cl.$^7$ ............................................... C06B 45/10
(52) U.S. Cl. .................... 149/19.3; 149/19.1; 149/19.8; 149/19.9; 149/22; 149/108.4
(58) Field of Search ............................ 149/19.3, 19.8, 149/108.4, 19.1, 19.9, 22

(56) References Cited

U.S. PATENT DOCUMENTS

| | | | |
|---|---|---|---|
| 2,995,431 A | | 8/1961 | Bice .................................. 52/5 |
| 3,719,913 A | * | 3/1973 | DuBose et al. .............. 338/114 |
| 3,793,097 A | * | 2/1974 | Lawrence ..................... 149/21 |
| 3,986,909 A | | 10/1976 | Macri ........................ 149/19.9 |
| 3,998,676 A | | 12/1976 | Plauson et al. ................. 149/7 |
| 4,092,189 A | * | 5/1978 | Betts ............................ 149/22 |
| 4,098,625 A | | 7/1978 | French et al. ............... 149/19.3 |
| 4,262,541 A | | 4/1981 | Jacobs .......................... 73/826 |
| 4,331,080 A | | 5/1982 | West et al. ................. 102/301 |
| 4,376,083 A | * | 3/1983 | Ulsteen .................... 149/19.92 |
| 4,397,700 A | | 8/1983 | Johnson et al. ................. 149/7 |
| 4,482,405 A | | 11/1984 | Wright ...................... 149/19.3 |
| 4,521,260 A | | 6/1985 | Johnson et al. .......... 149/19.91 |
| H000169 H | * | 12/1986 | Mackenzie et al. ........ 149/19.3 |
| 4,944,815 A | | 7/1990 | Consaga ..................... 149/19.1 |
| 4,978,400 A | | 12/1990 | Juneau, Jr. et al. ........... 149/21 |
| 5,027,707 A | * | 7/1991 | Mei ........................ 102/202.8 |
| 5,059,260 A | * | 10/1991 | Sayles ........................ 149/19.3 |
| 5,187,320 A | | 2/1993 | Yunan ..................... 102/275.8 |
| 5,468,313 A | | 11/1995 | Wallace, II et al. ........... 149/53 |
| 5,529,649 A | | 6/1996 | Lund et al. ................. 149/19.3 |
| 5,871,771 A | * | 2/1999 | Zierenberg et al. ......... 424/1.13 |
| 5,936,194 A | | 8/1999 | Marlow et al. ................ 149/2 |
| 5,972,137 A | | 10/1999 | Wypkema et al. ....... 149/109.6 |
| 6,315,847 B1 | * | 11/2001 | Lee et al. ................... 149/19.4 |
| 6,354,222 B1 | * | 3/2002 | Becker et al. .............. 102/323 |
| 6,402,864 B1 | * | 6/2002 | Gill et al. ................... 149/19.9 |
| 6,409,854 B1 | * | 6/2002 | Gill et al. ................... 149/19.9 |
| 6,485,586 B1 | * | 11/2002 | Gill et al. ...................... 149/18 |

* cited by examiner

*Primary Examiner*—Edward A. Miller
(74) *Attorney, Agent, or Firm*—Mark Homer

(57) ABSTRACT

A communication system comprises an input-output processor IOP (11) coupled to a plurality of network devices (10) and a protocol processor PP (12), both processors being coupled to a common memory (15). Memory access control means (16) resolves competition between the processors for memory access. Normally, if one of the two processors is accessing the memory, the memory control unit (16) allows that access to be completed before allowing the other processor to access the memory. But if data loss in a network device is imminent, the IOP, is granted a higher priority memory access, the memory access controller aborts (interrupts) any memory access by the PP, allowing the IOP to access the memory immediately.

16 Claims, No Drawings

ESD SENSITIVITY IN TITANIUM/BORON COMPOSITIONS

The present invention relates to memory access control in computer systems, and more particularly to the resolution of conflicts between a plurality of processors in systems with shared memory. It finds particular though not exclusive application in communication systems, and a novel communication system in which the invention may be employed will be outlined briefly.

The basic components of a communications system consist of a set of communication network devices coupled to a device controller which is in turn coupled to a memory. The primary function of the device controller is the scheduling of low-level call and packet handling to and from the network devices. However, a variety of higher-level functions are also required.

A system has been proposed in which two processors are provided, an input-output processor (IOP) and a protocol processor (PP). The IOP performs the scheduling of low-level call and packet handling to and from the network devices, while the PP performs the higher-level functions. The IOP is coupled to the network devices, and the IOP and PP are coupled together and to common memory, which contains the PP code and data, flow tables, data buffers, and data structures shared by the IOP and PP.

In this system, the two processors are both coupled to the same common memory. It is therefore possible that conflicts would arise if the two processors both attempted to access the memory at the same time.

Shared memory systems are known in the prior art, and there have been proposed essentially two systems for resolving conflicts.

One, simpler, system is based on a first come first served principle: if one of the processors is using the memory, it continues to maintain access to the memory until it has finished; if the other processor also wants to access the memory, it has to wait until the first processor has finished. A problem with this system is that the second processor may have to wait for a long period. It has been appreciated that in the context of the communication system outlined above, this may cause adverse consequences if the IOP were unable to service a peripheral device requiring immediate transfer of data to main memory.

In other circumstances, one of the processors may be able to wait for longer periods with no serious ill effects while the other processor may sometimes require relatively prompt servicing (with serious ill effects occurring if it is forced to wait for long periods). This is closer to the situation in the communication system described above; the PP can generally wait without serious ill effects, whereas if the IOP is forced to wait, loss of data may result.

An alternative system has been proposed for such circumstances, based on a priority and interrupt system. In such a system, one processor is assigned a higher priority than the other processor. If the lower priority processor is accessing the memory and the higher priority processor requires access to the memory, the lower priority processor is interrupted while the other processor carries out the memory access it requires.

Such a system could be used in the above described communication system, with the IOP being assigned a higher priority and the PP being assigned a lower priority; this would minimise the risk of data being lost while the IOP waited to access the memory.

The aborting of a memory cycle of the PP will not normally have serious effects on the PP, because the PP's operations will normally involve waiting when necessary to synchronize its operations with the memory cycles; so the aborting of a memory cycle initiated by the PP will simply result in the PP entering an extended wait state. Normally, if the aborted memory cycle is a read cycle, the PP will have to enter the wait state immediately if action is to be performed on the data just read. However, if the system includes buffering between the PP and the memory, the aborting of a write cycle may not cause the PP to enter the wait state immediately, as it may be able to continue with its processing until the write buffer becomes full.

Nevertheless, the inventor has appreciated that the efficiency of the PP may be seriously compromised in such a system, particularly where frequent accesses by the IOP are performed. In particular, where memory accesses involving a read or write of a burst of data are involved, the PP may have its cycles aborted frequently, and there is usually significant overhead associated with the beginning of a memory cycle, which will be lost every time the cycle is aborted. Thus, the PP may spend a significant proportion of its time beginning memory accesses which are subsequently aborted.

For the above reasons, it would appear on the face of it desirable to reduce the use of shared memory by the processors. However, the inventor has appreciated that advantages would accrue if the problems of shared memory access could be alleviated; for example, the two processors may be fabricated on a single substrate, employing common external memory, and data transfer may be facilitated by use of the shared memory.

Thus the general aim of the present invention is to provide a memory management system which alleviates or overcomes the above problems or disadvantages.

U.S. Pat. No. 4,400,771 describes a multiple processor system with a common memory, where priority of access to a shared memory system is under programmatic control through a register, i.e. variable but static on a cycle by cycle basis as predetermined through a register. U.S. Pat. No. 3,798,591 describes a system for multiple processors to access multiple storage devices on a fixed priority scheme. Storage units, which are in use by a particular processor, respond with signals to prevent access from other processors. U.S. Pat. No. 4,829,467 describes a resource sharing system but deals in detail with how a DRAM, in a memory system, arbitrates between normal accesses and higher priority accesses on a dynamic basis. The dynamic basis used is the number of previous accesses. U.S. Pat. No. 4,493,036 describes a dual port memory system with a dynamic priority allocation system. The latter works by breaking priority resolution into two stages: initial and final. A two stage priority resolution process allows an initial request to be regraded as a high priority request at a later stage within the same priority resolution cycle.

At least in its preferred embodiments, the invention enables at least two processors to have equal access but if one processor wished to access memory with a higher priority than the other, then the first processor's access would be interrupted. Priority access is also based on traffic conditions namely, the state of one or more peripheral devices attached to the respective processor.

Features of the invention are defined by the attached claims.

In the present invention, as long as the processors are all operating at the same priority level, whichever processor happens to be accessing the memory will be able to complete its access, with any other processor having to wait its turn. But if the second processor is accessing the memory and the first processor calls for a memory access with higher priority, then the second processor can be interrupted and the first processor can obtain immediate access to the memory. The loss of clock cycles resulting from such interruption therefore occurs only when the first processor cannot wait and interruption is essential.

Other preferred features and other aspects of the invention are set out in the claims.

It will of course be realized that, although possible, it is not essential for the system to be symmetrical (for each processor to be able to access the memory with each level of priority). In the communication system described above, for example, if the buffer of a device receiving incoming data is approaching overflow, it is important for the IOP to attend to that device urgently. The IOP therefore needs to be able to interrupt the PP. The PP's operations, however, are generally not time-critical, so the PP does not need to be able to interrupt the IOP. In other words, the IOP must be able to produce priority level signals at both high and low priority levels, while the PP only has to be able to produce a priority level signal at the low level.

Although preferably employed in a two-processor system, for example as described above, the system may be extended to more than two processors, in which case some means will normally also be required to resolve conflicts between processors at the same priority level. Various options are available for this, such as a first come first served basis (using a queue), a fixed priority sequence, or a round robin system.

It should be noted that the function of the memory access controller may be integrated with one or more of the processors; indeed, in the preferred application where the controller and processors are integrated on a single substrate, there may be no clearly defined physical boundary between the functional components. Additionally, the memory access controller may be integrated with components which detect the second state for other purposes; for example, where the second state corresponds to an imminent demand for service by one or more peripherals, for example based on buffer occupancy, a portion of the memory access controller may be integrated with components for determining a servicing schedule for the peripherals.

A communications system embodying the invention will now be described, by way of example, with reference to the drawings, in which:

FIG. 1 is a simplified block diagram of the system.

Referring to FIG. 1, the system comprises a set of network devices 10 coupled to an input/output processor IOP 11. There is also a protocol processor 12, and the IOP 11 and PP 12 are both coupled to a data and address bus 14 which is in turn coupled to a memory 15 via a memory access control unit 16. The IOP 11 and the PP 12 are coupled directly together for certain functions, for example exchange of certain interrupts and the like. It is convenient for the IOP to also have a small private memory 13 containing the IOP code and some data structures used only by and frequently accessed by the IOP. Similarly, the PP may have its own private memory (not shown).

Both the IOP 11 and the PP 12 may want to access the memory 15. They do this by sending memory access request signals on lines 20 and 21 respectively. The memory controller 16 receives these signals, and controls access to the memory 15 accordingly. The system may also include a cache memory controller, which may be at least partially integrated with the memory access controller; such details are not germane to the present invention.

The IOP can be granted a memory access request at either of two priority levels, high and low. In the "normal" state of the system, the IOP will be granted access at the low priority level, in which both the IOP and the PP access the memory on a first-come, first-served basis. But it may happen that the input buffer of a receiving network device 10 is approaching the full state, or the output buffer of an output device nearing an empty state. It is then urgent that device should be serviced by the IOP, to avoid the device's buffer overflowing or underflowing and data being lost, or a break in data output occurring.

Not shown is a buffer-level detecting device which monitors the condition of the buffers of devices coupled to the IOP. It is noted that the monitoring of the buffer states may be used to control scheduling of servicing of the devices, as described in our application filed concurrently herewith bearing our reference PDC/BVI/20021 entitled "Peripheral Servicing" and incorporated herein by reference, but this is not germane to the present invention. However, when the monitoring indicates that a predetermined number of buffers (which may be only one, more typically two) is about to overflow or underflow, and hence require urgent servicing, the memory access controller receives a signal to enter a second, exceptional or "panic", state of operation, in which the IOP is granted access at a higher priority. The second state may be signified either by one or a few devices requiring urgent servicing, or by a large number requiring moderately urgent servicing, or by a combination of these or other conditions.

In this embodiment, detection of the alternative state is performed by circuitry which can notionally be regarded as additional to the core functions of the processor. It will be appreciated that the circuitry may be integrated with the processor, and, alternatively or additionally, the IOP may be able to signal the alternative state explicitly. For example, the IOP may have capability to send more than one memory request signal to the access controller, one signifying normal mode access and the other signifying urgent access.

Granting higher priority access may entail immediate aborting of any pending access by the PP in favour of access by the IOP; this may be implemented in a similar manner to conventional hard-wired priority based schemes.

To recap, the general memory access scheme is as follows:

If only one of the two processors (the IOP and the PP) is requesting memory access, the memory control unit 16 allows that processor to access the memory 15.

If either of the processors is already accessing the memory and the other issues a low priority level memory access request, the memory controller allows the current processor to continue its memory access, and waits until that memory access has been completed before allowing the other processor to access the memory.

If, however, the PP is accessing the memory (that access being necessarily a low priority memory access) and the IOP issues a high priority memory access request, the memory controller aborts the PP's memory access and allows the IOP to access the memory immediately.

Of course, the IOP may already be generating a low priority level memory access request when a network device approaches buffer overflow (or underflow, for a transmitting device). It will then change the priority level of the its memory access request signal from low to high. Also, the IOP may be arranged to issue a high priority level memory access request in response to other conditions, such as if the number of network devices requiring servicing becomes large even though none of them is individually approaching overflow (or underflow).

Although only two states and two processors have been exemplified above, it will be appreciated that the invention can be extended to multiple priority levels and multiple processors. For example, in a "near panic" state, an intermediate priority level may be set, in which the IOP may cause the PP to abort a memory cycle if a burst read expected to take more than a predetermined number of clock cycles is in progress, but otherwise allow any pending "short" cycle to complete. With more than two processors, some or all may be capable of being assigned higher priority levels if needed. Where more than one processor can be assigned a higher priority level, means for arbitrating between processors of higher priority may be provided. For example the arbitration means may grant all higher priority requests on a first-come, first-served basis, or additional hard wired prioritising of access may be provided.

Thus it will be appreciated that the access controller may be employed in any system where the ability to respond dynamically to a change in system state to alter a memory access scheme is advantageous. It is to be noted that the precise levels of priority are not critical; the invention resides primarily in altering the level of priority for at least one processor. Whilst, in the first aspect, the first processor will normally be granted access with a higher priority than the second processor, it may be possible in some priority schemes for the priority granted to the first processor to be increased, without necessarily becoming greater than that afforded to the first processor.

What is claimed is:

1. A memory access controller for a computer system, the computer system including at least first and second processors, one or more peripheral devices coupled to the first processor, and a common memory accessed by the first and second processors, the controller comprising:
    means for receiving memory access requests from the first and second processors;
    means for granting access to the common memory according to an access scheme whereby:
        (a) access to the common memory is granted to the first or second processor according to a first access scheme in a first state of the system, and
        (b) priority access is granted to the first processor according to a second access scheme in a second state of the system, in which second state the first processor has a higher priority than the second processor;
    means for detecting the second state based on the state of the one or more peripheral devices coupled to the first processor; and
    means for interrupting the memory access of the second processor to provide access to the first processor when the system is in the second state.

2. A memory access controller according to claim 1, wherein the first access scheme is a first-come first-served scheme in which access requests are granted in the sequence received.

3. A memory access controller according to claim 1, wherein the means for detecting the second state includes means for monitoring buffer occupancy of each peripheral device, and means for signaling the second state when the buffer occupancy of each of a predetermined number of the peripheral devices fulfills a respective condition, the condition indicating that the peripheral device is in imminent need of service.

4. A memory access controller according to claim 1 and further including means for responding to a further state by granting higher priority access to the second processor.

5. A memory access controller according to claim 4, wherein the higher priority access is only granted to the first processor.

6. A memory access controller according to claim 1, further including means for controlling access to the common memory by the first and second processors and by at least one farther processor.

7. A memory access controller according to claim 6, wherein the access is granted to at least one, or to each further processor with a higher priority than another processor.

8. A memory access controller according to claim 7, including further means for resolving conflicts between the processors at the same priority level.

9. A memory access controller according to claim 1, including a substrate, the controller being integrated onto the same substrate as the processors with which it is intended to work.

10. Computer apparatus according to claim 1, wherein the processors and the memory access controller are integrated onto a single substrate.

11. Computer apparatus comprising a memory access controller for a computer system, the computer system including at least first and second processors, a plurality of peripheral devices coupled to the first processor, and a common memory accessed by the processors, the first processor being adapted to perform input/output operations, and the second processor being adapted to perform data processing, the controller comprising:
    means for receiving memory access requests from the first and second processors;
    means for granting access to the common memory according to an access scheme whereby:
        (a) access to the common memory is granted to the first or second processor according to a first access scheme in a first state of the system, and
        (b) priority access is granted to the first processor according to a second access scheme in a second state of the system, in which second state the first processor has a higher priority than the second processor;
    means for detecting the second state based on the state of the one or more peripheral devices couple to the first processor; and
    means for interrupting the memory access of the second processor to provide access to the first processor when the system is in the second state.

12. In a communication controller, computer apparatus comprising a memory access controller for a computer system, the computer system including at least first and second processors, a plurality of peripheral devices coupled to the first processor, and a common memory accessed by the processors, the first processor being adapted to perform input/output operations, and the second processor being adapted to perform data processing and also adapted to perform higher level communication functions which include communication protocol management, checking or conversion, the controller comprising:
    means for receiving memory access requests from the first and second processors;
    means for granting access to the common memory according to an access scheme whereby:
        (a) access to the common memory is granted to the first or second processor according to a first access scheme in a first state of the system, and
        (b) priority access is granted to the first processor according to a second access scheme in a second state of the system, in which second state the first processor has a higher priority than the second processor;

means for detecting the second state based on the state of the one or more peripheral devices couple to the first processor; and means for interrupting the memory access of the second processor to provide access to the first processor when the system is in the second state.

13. Computer apparatus according to claim 12, wherein the processors and the memory access controller are integrated onto a single substrate.

14. Computer apparatus according to claim 12, wherein the first processor comprises an input-output processor coupled to a plurality of network devices and the second processor comprises a protocol processor, the network devices having means for signaling when data loss is imminent and the memory access controller thereupon granting a high priority level memory access request to the input-output processor.

15. Computer apparatus according to claim 10, wherein the first processor comprises an input-output processor coupled to a plurality of network devices and the second processor comprises a protocol processor, the network devices having, means for signaling when data loss is imminent and the memory access controller thereupon granting a high priority level memory access request to the input-output processor.

16. A method of granting access by first and second processors to a common memory, the method comprising:

receiving memory a requests from the processors and granting access to the common memory according to an access scheme, whereby:

access to the common memory is granted to the first or second processor according to a first access scheme in a first state of the system, priority access is granted to the first processor according to a second access scheme in a second state of the system where the first processor has a higher priority than the second processor, detecting the second state based on the state of one or more peripheral devices coupled to the first processor, and interrupting memory access of the second processor to provide access to the first processor when the system is in the second state.

\* \* \* \* \*

UNITED STATES PATENT AND TRADEMARK OFFICE
CERTIFICATE OF CORRECTION

PATENT NO. : 6,723,190 B1
DATED : April 20, 2004
INVENTOR(S) : Gill, Robert C. et al.

It is certified that error appears in the above-identified patent and that said Letters Patent is hereby corrected as shown below:

Title page,
Item [*] Notice, delete "*Notice: This patent issued on a continued prosecution application filed under 37 CFR 1.53(d), and is subject to the twenty year patent term provisions of 35 U.S.C. 154(a)(2).".

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,723,190 B1
DATED : April 20, 2004
INVENTOR(S) : Gill, Robert C. et al.

It is certified that error appears in the above-identified patent and that said Letters Patent is hereby corrected as shown below:

The title page should be deleted and replaced with the attached title page.

The specification should be deleted and replaced with the attached specification.

Signed and Sealed this

Sixteenth Day of May, 2006

JON W. DUDAS
*Director of the United States Patent and Trademark Office*

(12) United States Patent
Gill et al.

(10) Patent No.: US 6,723,190 B1
(45) Date of Patent: *Apr. 20, 2004

(54) ESD SENSITIVITY IN TITANIUM/BORON COMPOSITIONS

(75) Inventors: Robert C. Gill, White Plains, MD (US); Carl Gotzmer, Accokeek, MD (US); Pamela Carpenter, Indian Head, MD (US); Eric Schlegel, Indian Head, MD (US)

(73) Assignee: The United States of America as represented by the Secretary of the Navy, Washington, DC (US)

(*) Notice: This patent is subject to a terminal disclaimer.

(21) Appl. No.: 09/697,247

(22) Filed: Oct. 27, 2000

(51) Int. Cl.$^7$ .............................................. C06B 45/10
(52) U.S. Cl. .................. 149/19.3; 149/19.1; 149/19.8; 149/19.9; 149/22; 149/108.4
(58) Field of Search ................. 149/19.3, 19.8, 149/108.4, 19.1, 19.9, 22

(56) References Cited

U.S. PATENT DOCUMENTS

| | | | |
|---|---|---|---|
| 2,995,431 A | | 8/1961 | Bice .................................. 52/5 |
| 3,719,913 A | * | 3/1973 | DuBose et al. ............... 338/114 |
| 3,793,097 A | * | 2/1974 | Lawrence ...................... 149/21 |
| 3,986,909 A | | 10/1976 | Macri ........................... 149/19.9 |
| 3,998,676 A | | 12/1976 | Plauson et al. .................. 149/7 |
| 4,092,189 A | * | 5/1978 | Betts ............................ 149/22 |
| 4,098,625 A | | 7/1978 | French et al. ................ 149/19.3 |
| 4,262,541 A | | 4/1981 | Jacobs ........................... 73/826 |
| 4,331,080 A | | 5/1982 | West et al. ................... 102/301 |
| 4,376,083 A | * | 3/1983 | Ulsteen ....................... 149/19.92 |
| 4,397,700 A | | 8/1983 | Johnson et al. ................. 149/7 |
| 4,482,405 A | | 11/1984 | Wright ......................... 149/19.3 |
| 4,521,260 A | | 6/1985 | Johnson et al. ............ 149/19.91 |
| H000169 H | * | 12/1986 | Mackenzie et al. ......... 149/19.3 |
| 4,944,815 A | | 7/1990 | Consaga ....................... 149/19.1 |
| 4,978,400 A | | 12/1990 | Juneau, Jr. et al. .......... 149/21 |
| 5,027,707 A | * | 7/1991 | Mei ............................. 102/202.8 |
| 5,059,260 A | * | 10/1991 | Sayles ......................... 149/19.3 |
| 5,187,320 A | | 2/1993 | Yunan ......................... 102/275.8 |
| 5,468,313 A | | 11/1995 | Wallace, II et al. ........... 149/53 |
| 5,529,649 A | | 6/1996 | Lund et al. .................. 149/19.3 |
| 5,871,771 A | * | 2/1999 | Zierenberg et al. .......... 424/1.13 |
| 5,936,194 A | | 8/1999 | Marlow et al. .................. 149/2 |
| 5,972,137 A | | 10/1999 | Wypkema et al. ......... 149/109.6 |
| 6,315,847 B1 | * | 11/2001 | Lee et al. ..................... 149/19.4 |
| 6,354,222 B1 | * | 3/2002 | Becker et al. ................ 102/323 |
| 6,402,864 B1 | * | 6/2002 | Gill et al. .................... 149/19.9 |
| 6,409,854 B1 | * | 6/2002 | Gill et al. .................... 149/19.9 |
| 6,485,586 B1 | * | 11/2002 | Gill et al. ....................... 149/18 |

* cited by examiner

*Primary Examiner*—Edward A. Miller
(74) *Attorney, Agent, or Firm*—Mark Homer

(57) ABSTRACT

A method for improving the ESD sensitivity in compositions having a reactive material of titanium, a second reactive material of boron, and an effective amount of a binder, by adding a lecithin component in an amount of from about 5 weight percent or less.

16 Claims, No Drawings

ESD SENSITIVITY IN TITANIUM/BORON COMPOSITIONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to ESD sensitive metal/metal compositions. More particularly, a composition of the present invention contains a wetting agent of lecithin with a binder to improve ESD sensitivity of titanium/boron compositions. Most particularly, the lecithin is present in amounts of approximately 1%.

2. Brief Description of the Related Art

Reducing the electrostatic discharge sensitivity (ESD) for dry metals is particularly importance in the manufacture of incendiary devices and other devices containing compositions having very high concentrations of metal powders. Highly reactive metals provide an excellent source for high burn temperatures and high energy, however, the more reactive the metal powders are, the more ESD sensitive they become. ESD sensitive metal powders are likely to ignite during handling or mixing, increasing hazards to personnel and manufacturing equipment.

Combinations of titanium and boron potentially possess extremely high ESD sensitivity, with ignition of approximately 0.0084 joules possible. In view of the foregoing, there is a need for a method to produce incendiary compositions having a reduced ESD sensitivity. The present invention addresses this need.

SUMMARY OF THE INVENTION

The present invention includes a high ESD sensitive composition having at least one reactive metal, preferably comprising a reactive material of titanium, a second reactive material of boron, an effective amount of an incendiary binder and a lecithin component in an amount of from about 5 weight percent or less.

The present invention also includes a method for producing a high temperature incendiary composition, comprising the steps of mixing a first combination of a reactive material of titanium with a second reactive material of boron, wherein the ratio of titanium to boron ranges from about 90/10 to about 60/40 and adding a lecithin component in an amount of from about 5 weight percent or less with an effective amount of an incendiary binder to the first combination.

DETAILED DESCRIPTION OF THE PREFERRED EMBODIMENT

The present invention relates to a method to improve the electrostatic discharge (ESD) sensitivity of binder/titanium/boron compositions. A wetting agent of lecithin is added to improve ESD sensitivity in compositions of at least one reactive metal, such as titanium and boron composition mixtures. The binder/lecithin combination is necessary as the lecithin does not produce the desired lowering of the ESD sensitivity unless a binder is present. With an improved ESD sensitivity, the compositions are safe to handle.

Safe ESD sensitivity for manufacture and handling of the present invention is greater than 0.023 joules. The human body is capable of producing approximately 0.0084 joules. The incendiary composition of the present invention contains a reactive material of titanium and a second reactive material of boron, and may further include an oxidizer of polytetrafluoroethylene. The high temperature incendiary composition has a wetting agent of lecithin that decreases the ESD sensitivity for the titanium/boron combination, or titanium/boron/polytetrafluoroethylene combination, to a value of more than approximately 0.023 joules. Lecithin comprises a soybean extract of phospholipids (mixed phosphatides with 35–38% oil). Lecithin is available from American Lecithin Company of Atlanta, Georgia under the tradename ALCOLEC™S.

Calculations show that mixture of the two reactive metals, titanium and boron, form an intermetallic compound together upon ignition. Solid titanium and boron react to form a liquid, i.e., molten, intermetallic compound, indicated by the formula:

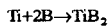

$$Ti+2B \rightarrow TiB_2$$

Other by-products occur, most significantly with the reaction of boron with polytetrafluoroethylene, and the reaction of the CTBN binder ingredients with titanium.

The titanium preferably comprises a particle size of from greater than from about 44 microns, with ESD sensitivity increasing to unsafe levels below 44 microns. Appropriate particle sizes for the titanium above from about 44 microns may be used as determine by those skilled in the art for a given purpose in light of the disclosure herein. Boron particles may include any acceptable size, such as from about 0.5 microns to about 1 micron in size, as determined by one of ordinary skill in the art. The chemicals are commercially available in finely divided powders. Titanium powder metal is available from Atlantic Equipment Engineers of Bergenfield, New Jersey under the catalog number TI-109, having a purity of approximately 99.7%. Boron is available from Callery Chemical Company of Pittsburgh, Pa. under the tradename SB 95 having from about 95% to about 97% boron and from about 5% to about 3% magnesium oxide (MgO) or SB 90 having from about 90% to about 92% boron and from about 10% to about 8% magnesium oxide (MgO), with both products having an amorphous state with an average particles size of approximately 0.6 microns. Titanium amounts preferably include from about 41 weight percent to about 61 weight percent, and more preferably from about 51 weight percent to about 61 weight percent, with boron in amounts of from about 11 weight percent to about 24 weight percent, more preferably from about 14 weight percent to about 24 weight percent. For example, titanium may comprise approximately 60.75 weight percent and boron approximately 14.25 weight percent of the total composition.

The weight ratio amount of titanium to boron needed for a high flame temperatures range from about 81/19 to about 69/31. Preferably within this range, the titanium and boron are present in the composition in substantially stoichiometric proportions for forming the intermetallic compound. As the ratio of titanium to boron decreases, the combination metal becomes increasingly more difficult to ignite, with the proper ratio of titanium to boron for a given incendiary composition determinable by those skilled in the art in light of the disclosure herein.

The incendiary composition may include an oxidizer of polytetrafluoroethylene, also known as Teflon®, in an amount of from about 20 weight percent or greater of the composition. Preferred amounts of polytetrafluoroethylene range from about 20 weight percent to about 30 weight percent, with more preferred amounts of polytetrafluoroethylene ranging from about 20 weight percent to about 25 weight percent. The particles of the polytetrafluoroethylene may be any suitable size, such as from about 20 microns to about 450 microns, with little affect on the burning rate or slag percentage. As the amount of polytetrafluoroethylene increases, the reaction energy of the titanium/boron ignition decreases, with the proper amount of polytetrafluoroethylene for a given incendiary composition determinable by those skilled in the art in light of the disclosure herein. Polytetrafluoroethylene is available from E. I. duPont de Nemours & Company of Wilmington, Del. under the tradename Teflon® 7C.

The incendiary binder may include any suitable binder for combining with the lecithin. Suitable binders include nitrocellulose (NC), a curable binder based on the hydroxyl-terminated butadiene acrylonitrile copolymer (HTPB), a fluorinated synthetic rubber (Viton A), a curable binder based on the carboxyl-terminated polybutadiene acrylonitrile copolymer (CTBN) and the like. The type and effective amount of binder is determinable by those skilled in the art for a given composition, preferably ranging from about 5 weight percent or greater of the composition. More preferred amounts of binder range from about 5 weight percent to about 20 weight percent, most preferably from about 5 weight percent to about 10 weight percent. Nitrocellulose (NC) is available from Aqualon, a Division of Hercules Incorporated located at Wilmington, Del. under the tradename HERCULES® NITROCELLULOSE, hydroxyl terminated polybutadiene polymer is available from ATOCHEM, INC. of Matvern, Pa. under the tradename POLY bd® R-45M 1% AO RESIN, fluorinated synthetic rubber is available from E. I. DuPont DeNemours & Co. of Wilmington, Del. under the tradename Viton® fluoroelastomers which comprises a copolymer of vinylidene fluoride and hexafluoropropylene, and carboxyl-terminated butadiene acrylonitrile copolymer is available from B. F. Goodrich of Brecksville, Ohio under the tradename HYCAR® 1300 series. HTPB and CTBN polymers are liquids under normal processing conditions, but the respective binders containing the polymers are permanently cured after coating the titanium, boron, and Teflon mixture, while the extremely viscous liquids NC and Viton that behave as tough polymers solids under normal conditions, are processed using a removable solvent. Use of these binders, permits storage and handling in areas with limited or uncontrolled environments, e.g., storage compartments on ships. As the amount of binder increases, the flame temperature and burning rate decrease, with the proper amount of binder for a given incendiary composition determinable by those skilled in the art in light of the disclosure herein, particularly with regard to melting point and final burn temperature.

The incendiary composition may be manufactured in a safe manner by decreasing the electrostatic discharge hazard during handling and mixing. The preferred method for preparing the invention includes adding the non-binder components, i. e., titanium, boron and optionally polytetrafluoroethylene, into a bowl before mixing. After the component powders are added, the electrostatic field (E-field) is measured. A commercially available electrostatic fieldmeter is used and measurement is determined according to the manufacturer's directions. E-field measurements of 3 kilovolts per inch or less permit the method to proceed, with the addition of a lecithin/binder combination. Once the lecithin/binder combination has been added, the components are mixed for a total of approximately two and one-half hours. Every half hour, during the first two and one hours, the mix is stopped and the blades and sides of the bowl are scrapped with a conductive spatula.

EXAMPLE 1

Titanium powder having a nominal particle size of 68 microns was mixed with boron powder having a nominal particle size of 0.6 microns. A combination of lecithin and nitrocellulose (11%N) was added to the metallic powder mixture. The final composition included 62.1% titanium, 27.9% boron, 9% nitrocellulose, and 1% lecithin. ESD was measured at a sensitivity of 0.165 joules. Without the lecithin component, and with 10% nitrocellulose, the ESD was measured at a sensitivity of 0.0084 joules.

EXAMPLE 2

Titanium powder having a nominal particle size of 68 microns was mixed with boron powder having a nominal particle size of 0.6 microns. A combination of lecithin and HTPB with crosslinder was added to the metallic powder mixture. The final composition included 55.2% titanium, 24.8% boron, 9% HTPB, and 1% lecithin. ESD was measured at a sensitivity of 0.095 joules. Without the lecithin component, and with 10% HTPB binder, the ESD was measured at a sensitivity of 0.010 joules.

EXAMPLE 3

Titanium powder having a nominal particle size of 68 microns was mixed with boron powder having a nominal particle size of 0.6 microns. A combination of lecithin and Viton A was added to the metallic powder mixture. The final composition included 62.1% titanium, 27.9% boron, 9% Viton A, and 1% lecithin. ESD was measured at a sensitivity of 0.095 joules. Without the lecithin component, and with 5% Viton A, the ESD was measured at a sensitivity of 0.010 joules.

EXAMPLE 4

Titanium powder having a particle size of 68 microns was mixed with boron powder having a particle size of 0.6 microns. A combination of lecithin and polytetrafluoroethylene was added to the metallic powder mixture. The final composition included 64.8% titanium, 15.2% boron, 10% polytetrafluoroethylene, and 1% lecithin. ESD was measured at a sensitivity of 0.095 joules.

COMPARATIVE EXAMPLE 1

Titanium powder having a particle size of nominal 68 microns and boron powder having a nominal particle size of 0.6 microns, and lecithin was added to a mixing container. Enough toluene was added to cover the solids and the ingredients mixed until thoroughly combined. A stream was air and further mixing was then used to remove the toluene. The final composition included 62% titanium, 28% boron, and 10% lecithin. This dry mixture gave an ESD sensitivity of 0.0084.

The foregoing summary, description, and examples of the invention are not intended to be limiting, but are only exemplary of the inventive features which are defined in the claims.

What is claimed is:

1. An ESD safe incendiary composition, comprising:
   a reactive material of titanium;
   a second reactive material of boron;

an effective amount of incendiary binder; and, lecithin in an amount of from about 5 weight percent or less wherein the composition has an ESD level of greater than approximately 0.023 joules.

2. An ESD safe incendiary composition, comprising:

a reactive material of titanium;

a second reactive material of boron;

an effective amount of incendiary binder selected from the group of nitrocellulose, a curable binder based on the hydroxyl-terminated butadiene acrylonitrile copolymer, a fluorinated synthetic rubber, and a curable binder based on the carboxyl-terminated polybutadiene acrylonitrile copolymer; and, lecithin in an amount of from about 5 weight percent or less wherein the composition has an ESD level of greater than approximately 0.023 joules.

3. The incendiary composition of claim 2, wherein the amount of lecithin ranges from about 0.5 weight percent to about 5 weight percent.

4. The incendiary composition of claim 3, wherein the amount of lecithin ranges from about 0.5 weight percent to about 2 weight percent.

5. The incendiary composition of claim 4, wherein the amount of lecithin ranges from about 0.5 weight percent to about 1.5 weight percent.

6. The incendiary composition of claim 5, wherein the lecithin range comprises an amount of approximately 1 weight percent.

7. The incendiary composition of claim 2, further comprising polytetrafluorethylene in an amount of from about 5 weight percent to about 15 weight percent.

8. The incendiary composition of claim 2, wherein the binder comprises nitrocellulose.

9. The incendiary composition of claim 2, wherein the binder comprises a hydroxyl terminated polybutadiene polymer.

10. The incendiary composition of claim 2, wherein the binder comprises a fluorinated synthetic rubber.

11. The incendiary composition of claim 2, wherein the binder comprises a carboxyl-terminated polybutadiene acrylonitrile.

12. The incendiary composition of claim 2, wherein the amount of titanium ranges from about 36 weight percent to about 81 weight percent.

13. The incendiary composition of claim 12, wherein the amount of titanium ranges from about 41 weight percent to about 73 weight percent.

14. The incendiary composition of claim 2, wherein the amount of boron ranges from about 6 weight percent to about 36 weight percent.

15. The incendiary composition of claim 14, wherein the amount of boron ranges from about 1 weight percent to about 28 weight percent.

16. An ESD safe incendiary composition, consisting essentially of:

a reactive material of titanium;

a second reactive material of boron;

an effective amount of incendiary binder selected from the group of nitrocellulose, a curable binder based on the hydroxyl-terminated butadiene acrylonitrile copolymer, a fluorinated synthetic rubber, and a curable binder based on the carboxyl-terminated polybutadiene acrylonitrile copolymer; and, lecithin in an amount of from about 5 weight percent or less wherein the composition has an ESD level of greater than approximately 0.023 joules.

* * * * *

UNITED STATES PATENT AND TRADEMARK OFFICE
CERTIFICATE OF CORRECTION

PATENT NO. : 6,723,190 B1
APPLICATION NO. : 09/697247
DATED : April 20, 2004
INVENTOR(S) : Gill, Robert C. et al.

It is certified that error appears in the above-identified patent and that said Letters Patent is hereby corrected as shown below:

The title page should be deleted and replaced with the attached title page.

The specification should be deleted and replaced with the attached specification.

This certificate supersedes Certificate of Correction issued May 16, 2006.

Signed and Sealed this

Tenth Day of October, 2006

JON W. DUDAS
*Director of the United States Patent and Trademark Office*

(12) United States Patent
Gill et al.

(10) Patent No.: US 6,723,190 B1
(45) Date of Patent: *Apr. 20, 2004

(54) ESD SENSITIVITY IN TITANIUM/BORON COMPOSITIONS

(75) Inventors: Robert C. Gill, White Plains, MD (US); Carl Gotzmer, Accokeek, MD (US); Pamela Carpenter, Indian Head, MD (US); Eric Schlegel, Indian Head, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/697,247

(22) Filed: Oct. 27, 2000

(51) Int. Cl.$^7$ .................................................. C06B 45/10
(52) U.S. Cl. .................... 149/19.3; 149/19.1; 149/19.8; 149/19.9; 149/22; 149/108.4
(58) Field of Search ............................. 149/19.3, 19.8, 149/108.4, 19.1, 19.9, 22

(56) References Cited

U.S. PATENT DOCUMENTS

| | | | |
|---|---|---|---|
| 2,995,431 A | | 8/1961 | Bice .................................. 52/5 |
| 3,719,913 A | * | 3/1973 | DuBose et al. .............. 338/114 |
| 3,793,097 A | * | 2/1974 | Lawrence ...................... 149/21 |
| 3,986,909 A | | 10/1976 | Macri .......................... 149/19.9 |
| 3,998,676 A | | 12/1976 | Plauson et al. ................. 149/7 |
| 4,092,189 A | * | 5/1978 | Betts ............................. 149/22 |
| 4,098,625 A | | 7/1978 | French et al. ............... 149/19.3 |
| 4,262,541 A | | 4/1981 | Jacobs ......................... 73/826 |
| 4,331,080 A | | 5/1982 | West et al. .................. 102/301 |
| 4,376,083 A | * | 3/1983 | Ulsteen .................... 149/19.92 |
| 4,397,700 A | | 8/1983 | Johnson et al. ................. 149/7 |
| 4,482,405 A | | 11/1984 | Wright ....................... 149/19.3 |
| 4,521,260 A | | 6/1985 | Johnson et al. .......... 149/19.91 |
| H000169 H | * | 12/1986 | Mackenzie et al. ........ 149/19.3 |
| 4,944,815 A | | 7/1990 | Consaga ..................... 149/19.1 |
| 4,978,400 A | | 12/1990 | Juneau, Jr. et al. ........... 149/21 |
| 5,027,707 A | * | 7/1991 | Mei ......................... 102/202.8 |
| 5,059,260 A | * | 10/1991 | Sayles ....................... 149/19.3 |
| 5,187,320 A | | 2/1993 | Yunan ...................... 102/275.8 |
| 5,468,313 A | | 11/1995 | Wallace, II et al. .......... 149/53 |
| 5,529,649 A | | 6/1996 | Lund et al. ................. 149/19.3 |
| 5,871,771 A | * | 2/1999 | Zierenberg et al. ........ 424/1.13 |
| 5,936,194 A | | 8/1999 | Marlow et al. ................. 149/2 |
| 5,972,137 A | | 10/1999 | Wypkema et al. ....... 149/109.6 |
| 6,315,847 B1 | * | 11/2001 | Lee et al. ................... 149/19.4 |
| 6,354,222 B1 | * | 3/2002 | Becker et al. .............. 102/323 |
| 6,402,864 B1 | * | 6/2002 | Gill et al. ................... 149/19.9 |
| 6,409,854 B1 | * | 6/2002 | Gill et al. ................... 149/19.9 |
| 6,485,586 B1 | * | 11/2002 | Gill et al. ...................... 149/18 |

* cited by examiner

*Primary Examiner*—Edward A. Miller
(74) *Attorney, Agent, or Firm*—Mark Homer

(57) ABSTRACT

A method for improving the ESD sensitivity in compositions having a reactive material of titanium, a second reactive material of boron, and an effective amount of a binder, by adding a lecithin component in an amount of from about 5 weight percent or less.

16 Claims, No Drawings

ESD SENSITIVITY IN TITANIUM/BORON COMPOSITIONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to ESD sensitive metal/metal compositions. More particularly, a composition of the present invention contains a wetting agent of lecithin with a binder to improve ESD sensitivity of titanium/boron compositions. Most particularly, the lecithin is present in amounts of approximately 1%.

2. Brief Description of the Related Art

Reducing the electrostatic discharge sensitivity (ESD) for dry metals is particularly importance in the manufacture of incendiary devices and other devices containing compositions having very high concentrations of metal powders. Highly reactive metals provide an excellent source for high burn temperatures and high energy, however, the more reactive the metal powders are, the more ESD sensitive they become. ESD sensitive metal powders are likely to ignite during handling or mixing, increasing hazards to personnel and manufacturing equipment.

Combinations of titanium and boron potentially possess extremely high ESD sensitivity, with ignition of approximately 0.0084 joules possible. In view of the foregoing, there is a need for a method to produce incendiary compositions having a reduced ESD sensitivity. The present invention addresses this need.

SUMMARY OF THE INVENTION

The present invention includes a high ESD sensitive composition having at least one reactive metal, preferably comprising a reactive material of titanium, a second reactive material of boron, an effective amount of an incendiary binder and a lecithin component in an amount of from about 5 weight percent or less.

The present invention also includes a method for producing a high temperature incendiary composition, comprising the steps of mixing a first combination of a reactive material of titanium with a second reactive material of boron, wherein the ratio of titanium to boron ranges from about 90/10 to about 60/40 and adding a lecithin component in an amount of from about 5 weight percent or less with an effective amount of an incendiary binder to the first combination.

DETAILED DESCRIPTION OF THE PREFERRED EMBODIMENT

The present invention relates to a method to improve the electrostatic discharge (ESD) sensitivity of binder/titanium/boron compositions. A wetting agent of lecithin is added to improve ESD sensitivity in compositions of at least one reactive metal, such as titanium and boron composition mixtures. The binder/lecithin combination is necessary as the lecithin does not produce the desired lowering of the ESD sensitivity unless a binder is present. With an improved ESD sensitivity, the compositions are safe to handle.

Safe ESD sensitivity for manufacture and handling of the present invention is greater than 0.023 joules. The human body is capable of producing approximately 0.0084 joules. The incendiary composition of the present invention contains a reactive material of titanium and a second reactive material of boron, and may further include an oxidizer of polytetrafluoroethylene. The high temperature incendiary composition has a wetting agent of lecithin that decreases the ESD sensitivity for the titanium/boron combination, or titanium/boron/polytetrafluoroethylene combination, to a value of more than approximately 0.023 joules. Lecithin comprises a soybean extract of phospholipids (mixed phosphatides with 35–38% oil). Lecithin is available from American Lecithin Company of Atlanta, Georgia under the tradename ALCOLEC™S.

Calculations show that mixture of the two reactive metals, titanium and boron, form an intermetallic compound together upon ignition. Solid titanium and boron react to form a liquid, i.e., molten, intermetallic compound, indicated by the formula:

$$Ti + 2B \rightarrow TiB_2$$

Other by-products occur, most significantly with the reaction of boron with polytetrafluoroethylene, and the reaction of the CTBN binder ingredients with titanium.

The titanium preferably comprises a particle size of from greater than from about 44 microns, with ESD sensitivity increasing to unsafe levels below 44 microns. Appropriate particle sizes for the titanium above from about 44 microns may be used as determine by those skilled in the art for a given purpose in light of the disclosure herein. Boron particles may include any acceptable size, such as from about 0.5 microns to about 1 micron in size, as determined by one of ordinary skill in the art. The chemicals are commercially available in finely divided powders. Titanium powder metal is available from Atlantic Equipment Engineers of Bergenfield, New Jersey under the catalog number TI-109, having a purity of approximately 99.7%. Boron is available from Callery Chemical Company of Pittsburgh, Pa. under the tradename SB 95 having from about 95% to about 97% boron and from about 5% to about 3% magnesium oxide (MgO) or SB 90 having from about 90% to about 92% boron and from about 10% to about 8% magnesium oxide (MgO), with both products having an amorphous state with an average particles size of approximately 0.6 microns. Titanium amounts preferably include from about 41 weight percent to about 61 weight percent, and more preferably from about 51 weight percent to about 61 weight percent, with boron in amounts of from about 11 weight percent to about 24 weight percent, more preferably from about 14 weight percent to about 24 weight percent. For example, titanium may comprise approximately 60.75 weight percent and boron approximately 14.25 weight percent of the total composition.

The weight ratio amount of titanium to boron needed for a high flame temperatures range from about 81/19 to about 69/31. Preferably within this range, the titanium and boron are present in the composition in substantially stoichiometric proportions for forming the intermetallic compound. As the ratio of titanium to boron decreases, the combination metal becomes increasingly more difficult to ignite, with the proper ratio of titanium to boron for a given incendiary composition determinable by those skilled in the art in light of the disclosure herein.

The incendiary composition may include an oxidizer of polytetrafluoroethylene, also known as Teflon®, in an amount of from about 20 weight percent or greater of the composition. Preferred amounts of polytetrafluoroethylene range from about 20 weight percent to about 30 weight percent, with more preferred amounts of polytetrafluoroethylene ranging from about 20 weight percent to about 25 weight percent. The particles of the polytetrafluoroethylene may be any suitable size, such as from about 20 microns to about 450 microns, with little affect on the burning rate or slag percentage. As the amount of polytetrafluoroethylene increases, the reaction energy of the titanium/boron ignition decreases, with the proper amount of polytetrafluoroethylene for a given incendiary composition determinable by those skilled in the art in light of the disclosure herein. Polytetrafluoroethylene is available from E. I. duPont de Nemours & Company of Wilmington, Del. under the tradename Teflon® 7C.

The incendiary binder may include any suitable binder for combining with the lecithin. Suitable binders include nitrocellulose (NC), a curable binder based on the hydroxyl-terminated butadiene acrylonitrile copolymer (HTPB), a fluorinated synthetic rubber (Viton A), a curable binder based on the carboxyl-terminated polybutadiene acrylonitrile copolymer (CTBN) and the like. The type and effective amount of binder is determinable by those skilled in the art for a given composition, preferably ranging from about 5 weight percent or greater of the composition. More preferred amounts of binder range from about 5 weight percent to about 20 weight percent, most preferably from about 5 weight percent to about 10 weight percent. Nitrocellulose (NC) is available from Aqualon, a Division of Hercules Incorporated located at Wilmington, Del. under the tradename HERCULES® NITROCELLULOSE, hydroxyl terminated polybutadiene polymer is available from ATOCHEM, INC. of Matvern, Pa. under the tradename POLY bd® R-45M 1% AO RESIN, fluorinated synthetic rubber is available from E. I. DuPont DeNemours & Co. of Wilmington, Del. under the tradename Viton® fluoroelastomers which comprises a copolymer of vinylidene fluoride and hexafluoropropylene, and carboxyl-terminated butadiene acrylonitrile copolymer is available from B. F. Goodrich of Brecksville, Ohio under the tradename HYCAR® 1300 series. HTPB and CTBN polymers are liquids under normal processing conditions, but the respective binders containing the polymers are permanently cured after coating the titanium, boron, and Teflon mixture, while the extremely viscous liquids NC and Viton that behave as tough polymers solids under normal conditions, are processed using a removable solvent. Use of these binders, permits storage and handling in areas with limited or uncontrolled environments, e.g., storage compartments on ships. As the amount of binder increases, the flame temperature and burning rate decrease, with the proper amount of binder for a given incendiary composition determinable by those skilled in the art in light of the disclosure herein, particularly with regard to melting point and final burn temperature.

The incendiary composition may be manufactured in a safe manner by decreasing the electrostatic discharge hazard during handling and mixing. The preferred method for preparing the invention includes adding the non-binder components, i. e., titanium, boron and optionally polytetrafluoroethylene, into a bowl before mixing. After the component powders are added, the electrostatic field (E-field) is measured. A commercially available electrostatic fieldmeter is used and measurement is determined according to the manufacturer's directions. E-field measurements of 3 kilovolts per inch or less permit the method to proceed, with the addition of a lecithin/binder combination. Once the lecithin/binder combination has been added, the components are mixed for a total of approximately two and one-half hours. Every half hour, during the first two and one hours, the mix is stopped and the blades and sides of the bowl are scrapped with a conductive spatula.

EXAMPLE 1

Titanium powder having a nominal particle size of 68 microns was mixed with boron powder having a nominal particle size of 0.6 microns. A combination of lecithin and nitrocellulose (11%N) was added to the metallic powder mixture. The final composition included 62.1% titanium, 27.9% boron, 9% nitrocellulose, and 1% lecithin. ESD was measured at a sensitivity of 0.165 joules. Without the lecithin component, and with 10% nitrocellulose, the ESD was measured at a sensitivity of 0.0084 joules.

EXAMPLE 2

Titanium powder having a nominal particle size of 68 microns was mixed with boron powder having a nominal particle size of 0.6 microns. A combination of lecithin and HTPB with crosslinder was added to the metallic powder mixture. The final composition included 55.2% titanium, 24.8% boron, 9% HTPB, and 1% lecithin. ESD was measured at a sensitivity of 0.095 joules. Without the lecithin component, and with 10% HTPB binder, the ESD was measured at a sensitivity of 0.010 joules.

EXAMPLE 3

Titanium powder having a nominal particle size of 68 microns was mixed with boron powder having a nominal particle size of 0.6 microns. A combination of lecithin and Viton A was added to the metallic powder mixture. The final composition included 62.1% titanium, 27.9% boron, 9% Viton A, and 1% lecithin. ESD was measured at a sensitivity of 0.095 joules. Without the lecithin component, and with 5% Viton A, the ESD was measured at a sensitivity of 0.010 joules.

EXAMPLE 4

Titanium powder having a particle size of 68 microns was mixed with boron powder having a particle size of 0.6 microns. A combination of lecithin and polytetrafluoroethylene was added to the metallic powder mixture. The final composition included 64.8% titanium, 15.2% boron, 10% polytetrafluoroethylene, and 1% lecithin. ESD was measured at a sensitivity of 0.095 joules.

COMPARATIVE EXAMPLE 1

Titanium powder having a particle size of nominal 68 microns and boron powder having a nominal particle size of 0.6 microns, and lecithin was added to a mixing container. Enough toluene was added to cover the solids and the ingredients mixed until thoroughly combined. A stream was air and further mixing was then used to remove the toluene. The final composition included 62% titanium, 28% boron, and 10% lecithin. This dry mixture gave an ESD sensitivity of 0.0084.

The foregoing summary, description, and examples of the invention are not intended to be limiting, but are only exemplary of the inventive features which are defined in the claims.

What is claimed is:

1. An ESD safe incendiary composition, comprising:
   a reactive material of titanium;
   a second reactive material of boron;

an effective amount of incendiary binder; and, lecithin in an amount of from about 5 weight percent or less wherein the composition has an ESD level of greater than approximately 0.023 joules.

2. An ESD safe incendiary composition, comprising:

a reactive material of titanium;

a second reactive material of boron;

an effective amount of incendiary binder selected from the group of nitrocellulose, a curable binder based on the hydroxyl-terminated butadiene acrylonitrile copolymer, a fluorinated synthetic rubber, and a curable binder based on the carboxyl-terminated polybutadiene acrylonitrile copolymer; and, lecithin in an amount of from about 5 weight percent or less wherein the composition has an ESD level of greater than approximately 0.023 joules.

3. The incendiary composition of claim 2, wherein the amount of lecithin ranges from about 0.5 weight percent to about 5 weight percent.

4. The incendiary composition of claim 3, wherein the amount of lecithin ranges from about 0.5 weight percent to about 2 weight percent.

5. The incendiary composition of claim 4, wherein the amount of lecithin ranges from about 0.5 weight percent to about 1.5 weight percent.

6. The incendiary composition of claim 5, wherein the lecithin range comprises an amount of approximately 1 weight percent.

7. The incendiary composition of claim 2, further comprising polytetrafluorethylene in an amount of from about 5 weight percent to about 15 weight percent.

8. The incendiary composition of claim 2, wherein the binder comprises nitrocellulose.

9. The incendiary composition of claim 2, wherein the binder comprises a hydroxyl terminated polybutadiene polymer.

10. The incendiary composition of claim 2, wherein the binder comprises a fluorinated synthetic rubber.

11. The incendiary composition of claim 2, wherein the binder comprises a carboxyl-terminated polybutadiene acrylonitrile.

12. The incendiary composition of claim 2, wherein the amount of titanium ranges from about 36 weight percent to about 81 weight percent.

13. The incendiary composition of claim 12, wherein the amount of titanium ranges from about 41 weight percent to about 73 weight percent.

14. The incendiary composition of claim 2, wherein the amount of boron ranges from about 6 weight percent to about 36 weight percent.

15. The incendiary composition of claim 14, wherein the amount of boron ranges from about 1 weight percent to about 28 weight percent.

16. An ESD safe incendiary composition, consisting essentially of:

a reactive material of titanium;

a second reactive material of boron;

an effective amount of incendiary binder selected from the group of nitrocellulose, a curable binder based on the hydroxyl-terminated butadiene acrylonitrile copolymer, a fluorinated synthetic rubber, and a curable binder based on the carboxyl-terminated polybutadiene acrylonitrile copolymer; and, lecithin in an amount of from about 5 weight percent or less wherein the composition has an ESD level of greater than approximately 0.023 joules.

* * * * *